United States Patent [19]

Fujimoto et al.

[11] 3,800,319

[45] Mar. 26, 1974

[54] CASSETTE TYPE TAPE RECORDING AND REPRODUCING APPARATUS

[75] Inventors: Eisuke Fujimoto; Yoshio Yoshikawa, both of Tokyo, Japan

[73] Assignee: Akai Electric Company, Limited, Tokyo, Japan

[22] Filed: Apr. 20, 1971

[21] Appl. No.: 135,630

[30] Foreign Application Priority Data

Apr. 20, 1970 Japan .............................. 45-33616
June 15, 1970 Japan .............................. 45-51772
Oct. 7, 1970 Japan .............................. 45-88067

[52] U.S. Cl. ......................................... 360/92
[51] Int. Cl. ...................... G11b 23/12, G11b 15/24
[58] Field of Search ............. 274/4 F; 242/180, 181, 242/197–200; 352/6, 7, 8, 123; 353/15; 179/100.2 Z

[56] References Cited

UNITED STATES PATENTS 3,603,597 9/1971 Haake ................................ 274/4 F
3,582,082 6/1971 Takagi ................................ 274/4 F
3,512,786 5/1970 Bam ................................ 274/4 F

*Primary Examiner*—Louis R. Prince
*Assistant Examiner*—A. J. Mirabito
*Attorney, Agent, or Firm*—Fisher, Spivak, McClelland & Maier

[57] ABSTRACT

In a magnetic tape recording and reproducing apparatus utilizing cassettes in which the magnetic tape is wholly contained on two reels, the cassette is automatically turned over during or after the finish of recording or reproducing of the tape running in one direction to continue recording or reproducing of the tape running in the opposite direction, or the cassette is automatically discharged during or after the finish of recording or reproducing of the tape. A plurality of cassettes which are loaded in the cassette type tape recorder are automatically and successively turned over one after another for recording or reproducing and then discharged. It is possible, therefore, to effect recording or reproducing of the tape running in one traveling direction and then in the opposite traveling direction.

13 Claims, 19 Drawing Figures

INVENTORS
EISUKE FUJIMOTO
YOSHIO YOSHIKAWA

BY Oblon, Fisher & Spivak
ATTORNEYS

PATENTED MAR 26 1974 3,800,319

SHEET 2 OF 8

CASSETTE TYPE TAPE RECORDING AND REPRODUCING APPARATUS

BACKGROUND OF THE INVENTION

1. Field of the Invention

This invention relates to a magnetic tape recording and reproducing apparatus utilizing cartridges or cassettes in which the magnetic tape is wholly contained on reels (such apparatus will be referred to as "cassette type tape recorder" hereinafter in the specification), and more particularly relates to a cassette type tape recorder in which the cassette is automatically turned over during or after the finish of recording or reproducing of the tape running in one direction to continue recording or reproducing of the tape in the opposite direction of the tape travel, or the cassette is automatically discharged after recording or reproducing of the tape is finished for either one or both sides of the cassette.

2. Description of the Prior Art

There have been known in the past magnetic recording and reproducing apparatuses in which continuous recording or reproducing of the magnetic tape is effected for both sides of a cassette loaded in the apparatus. In one of the apparatuses, magnetic heads are movably arranged normal to the direction of tape travel in coincidence with the reverse thereof, and in the other one, a plurality of magnetic heads are provided in positions corresponding to tracks on the tape and are selectively changed over in coincidence with the reverse of the direction of tape travel.

Tape cassettes typically include a hollow case and a pair of magnetic tape winding reels mounted in the case to be turned when the cassette is removably loaded on the recording or reproducing apparatus. The tape includes tracks to be recorded in each direction of winding with respect to the reels.

With the advent of the so-called "compact cassette", tape width is so narrow that alignment of the movable heads with their corresponding tracks on the tape is difficult and, on the other hand, openings on the front side of the cassette through which magnetic heads engage with the tape are so small that provision of a plurality of such magnetic heads or a single magnetic head having a plurality of magnetic cores included therein is difficult. Even if it were possible to realize such a structure in a cassette type tape recorder, resulting electromechanical performance thereof would be undesirable.

Separately from the above apparatus, there have also been proposed automatic cassette exchange mechanisms in which the cassette is automatically discharged every time recording or reproducing of the tape is finished with respect to only one side of the cassette, and thereafter further recording or reproducing commences with respect to the next newly loaded cassette. One of such mechanisms is arranged in such a manner that a plurality of cassettes are loaded in the apparatus one on top of the other, the reel spindles and a capstan are brought into penetrating engagement with the lowermost cassette.

At the same time, magnetic heads are brought into cooperative position with the magnetic tape through openings provided on the front side of the cassette, and a pinch roller is also pressed against the capstan with the tape therebetween, whereby recording or reproducing of the tape is effected. These reel spindles and the capstan are disengaged from the cassette as soon as it is detected that one of the reels has finished winding of the tape to its full extent, and the magnetic heads and the pinch roller are also moved away from the tape. After that, the lowermost cassette is automatically discharged and the remaining cassettes left as they are, with the result that the latter descend by the height of one cassette and likewise recording or reproducing will automatically commence for the new lowermost cassette. In this manner, recording or reproducing is automatically effected for a plurality of cassettes one after another.

In the mechanism as above described wherein the reel spindles and the capstan are disengaged from the cassette, it is very difficult to move them toward or away from the cassette because they are associated with the respective driving mechanisms. In order to remove this difficulty, use has been made, in the past, of a movable base mount which mounts the reel spindles, the capstan, the driving means associated therewith, positioning members such as pins for the cassette itself and the like. Such an arrangement, however, has drawbacks in that any vibration of the movable base mount is transmitted to the reel spindles and the capstan, causing the magnetic tape driven by them to change in its travelling speed. This can result in fluctuation of frequency of the reproduced signal, causing "wow and flutter".

In order to obviate this drawback, it has been suggested that the cassette be lifted up instead of lowering the reel spindles and the capstan as above described, when it is desired to disengage the cassette from the reel spindles, and that the cassette then be discharged. According to this method, however, all of the cassettes resting on the lowermost cassette to be discharged must be lifted up. It follows that the remaining cassettes are moved up and down together with the lowermost cassette every discharge time. This results in that a large force is required to lift up the lowermost cassette, and that the remaining cassettes are badly affected by objectionable vibration.

SUMMARY OF THE INVENTION

The present invention intends to remove the above mentioned drawbacks attendant on prior art recording and reproducing apparatuses, and provides a cassette type tape recorder which assures automatically continuous recording and reproducing of magnetic tape running in first one and then the other directions of travel. In this tape recorder, a cassette is automatically turned over when recording or reproducing has been finished in one direction of tape travel and, if desired, the cassette is automatically discharged when recording or reproducing has been finished in the opposite direction of tape travel and another cassette is newly loaded for further recording or reproducing. According to the present invention, recording or reproducing can be effected continuously for a number of cassettes one after another with respect to both sides of each of them.

In the present invention, all of the cassettes to be loaded in the recording or reproducing position of the tape recorder are held a short distance from the cassette being recorded or reproduced, and the lowermost cassette is brought into the recording or reproducing position just after the pending cassette has been discharged. Accordingly, when the latter is lifted for discharge, there will be no need to lift the remaining cassettes.

It is, therefore, a principal object of this invention to provide a cassette type tape recorder in which a cassette is automatically turned over for further recording and reproducing.

Another object of this invention is to provide a cassette type tape recorder in which a plurality of cassettes are automatically turned over one after another and discharged in the same order.

A further object of this invention is to provide a cassette type tape recorder in which a plurality of cassettes are automatically loaded one by one into recording or reproducing position with ease.

BRIEF DESCRIPTION OF THE DRAWINGS

The above and further objects and features of the present invention will become apparent when reference is made to the following description in conjunction with accompanying drawings in which.

DETAILED DESCRIPTION OF THE PREFERRED EMBODIMENT

Figures 1, 2:
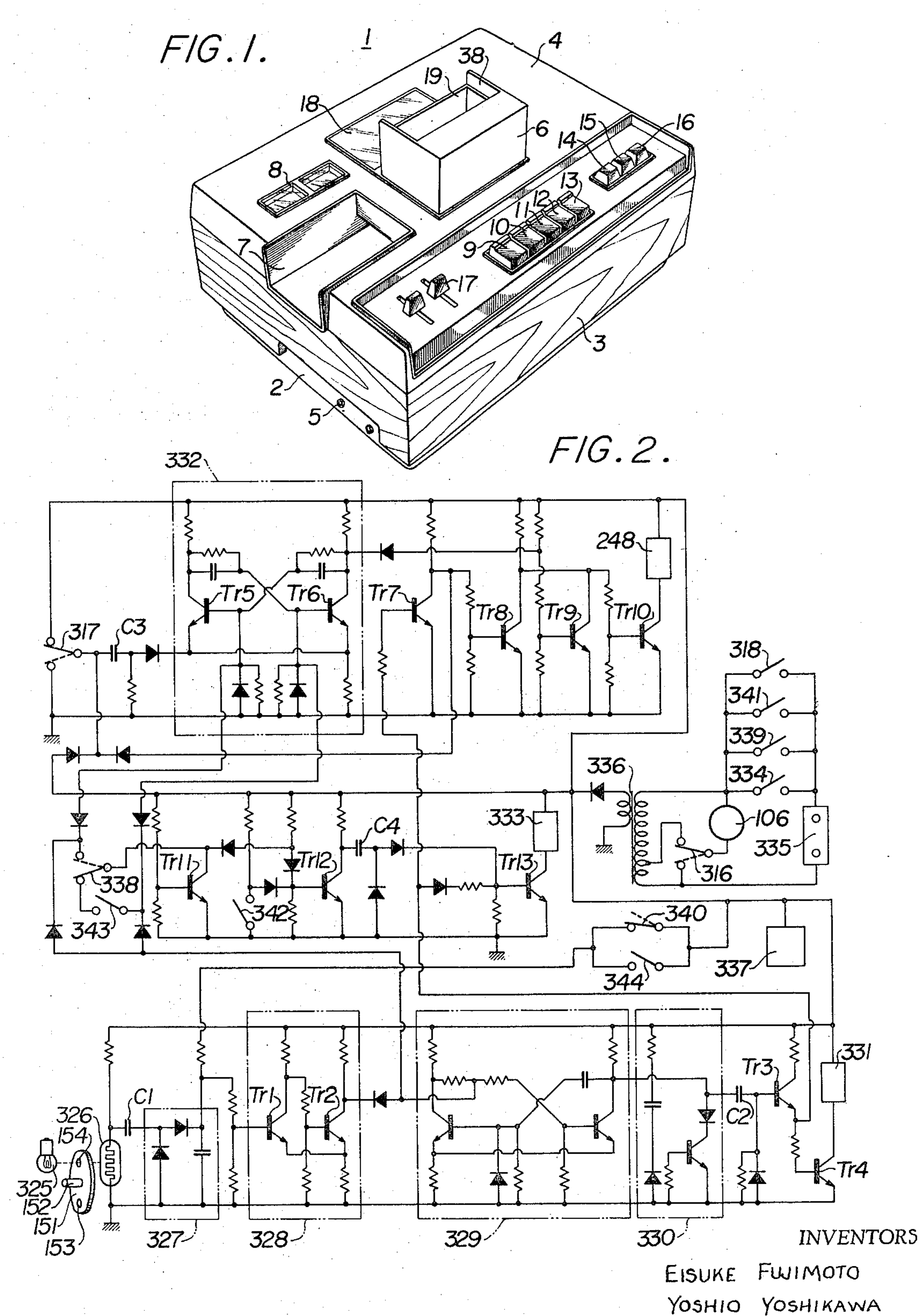
FIG. 1 is a perspective view of the cassette type tape recorder in accordance with this invention.
FIG. 2 is an electrical circuit diagram of the control system for the tape recorder.

Referring now to the drawings, wherein like reference numerals designate identical as is well throughout the several views, and more particularly to FIG. 1 thereof, there is shown a cassette type tape recorder 1 from the to the prsent invention which comprises a lower cover plate 2 mounting the mechanism and an upper cover plate 4 mating with this frame for covering the mechanism from above. Connecting terminals 5 are arranged on one side of the lower cover plate 2 for connection with outside electrical circuits. Projecting from the upper cover plate 4 are a guide case 6 for insertion of cassettes, a guide case 7 for discharge of the cassette, a recording level meter or so-called VU meter 8, a recording push button 9, a rewinding push button 10, a stopping push button 11, a playback push button 12, a fast winding push button 13, a starting and cassette discharging button 14, a cassette turning over button 15, a power button 16 and a volume control sliding knob 17. A viewing window 18 is provided through which the turning operation of the cassette can be observed.

First of all, a mechanism for turning over the cassette will be described with reference to FIGS. 3,4,5,6 and 8. In the present invention, however, the tape driving mechanism, the mechanism for driving reel spindles and other mechanisms, such as the ones for recording, reproducing, fast winding and rewinding are similar to conventional cassette type tape recorders and the explanation thereof is omitted in this specification.

On a first chassis plate 20, a supply reel spindle 21, a takeup reel spindle 22 and a capstan 23 are pivoted in the known manner, and posts 28, 29 and 30, 31 are also secured to the plate 20. The posts 28 and 29 determine the final position of a cassette when the same is loaded in the normal position and the posts 30 and 31 pass through the penetrating holes of the cassette and restrict lateral movement of the cassette. A cassette lifting member 32 for lifting the cassette when desired, is pivotably mounted at 33 and 34 to the chassis plate 20, and a post 35 is also secured to this chassis plate 20 for determining the lowermost position of the cassette lifting member 32 with respect to the chassis plate 20 (See FIGS. 5, 6 and 8). As can be clearly seen from FIG. 10, the cassette lifting member 32 has upstanding walls 36 and 37 at either side, and the wall 36 is provided with a guide slot 44 for a guide pin 41 secured to one lateral side wall 65 of the carrying member 40 by which the cassette 24 is transported. Another wall 37 is also provided with a guide slot 45 for a guide pin 52 secured to a sliding member 51 which in turn is provided with a groove 43 adapted to engage with a roller 42 fixed to the carrying member 40 as hereinafter described.

The cassette lifting member 32 is provided with openings 46 and 47 through which the reel spindles 21 and 22 are freely passed respectively, an opening 48 within which the cassette 24 is turned over and openings 49 and 50 through which the posts 28 and 29 are freely passed. The lifting member 32 is also provided with upstanding walls 53 and 54 at its rear part, to which walls a shaft 55 is pivoted. To this shaft 55 are secured a gear 56 by means of a screw 58, and a cassette receiver 57 into which the cassette 24 is loosely brought as hereinafter described. The receiver 57 comprises two F-shaped sheets positioned one above the other and connected with each other at the rear ends thereof, and rollers 59, 60, 61 and 62 (62 is not seen in the drawing) are secured to the respective branches of the F-shaped sheets of the receiver 57. On the bottom of the lifting member 32 is fixed a bent angle 94 to which a fan-shaped gear 110 is povitably mounted at 109. This gear 110 is adapted to engage with the gear 56 through an opening 112 provided in the first chassis plate 20 and an opening 111 provided in the lifting member 32, and is normally baised clockwise in FIG. 10 by means of a tension spring 113, one end of which is attached to the chassis plate 20 through a stud extending therefrom. A hauling rod 114 is pivoted to the fan-shaped gear 110 for rotating the same counterclockwise against the tension by the spring 113. A cassette guide member 171 is secured to the bottom of the lifting member 32 to guide the cassette during its turning over period.

The cassette carrying member 40 includes an elongated plate 66 laterally extending across the member and having both lateral ends downwardly bent, one of which provides a vertical side wall 63 extending frontward of the tape recorder and in parallel with the wall 36 of the lifting member 32. The side wall 63 extends laterally from its bottom to provide a bottom wall 64 which in turn stands up to provide another side wall 65 which is also parallel and in close contact with the wall 36. The opposite end of the elongated plate 66 of the carrying member 40 is bent downwardly to provide a hanging tab 67 to which the roller 42 is fixed as described hereinbefore. The guide pin 41 is fixed to said other side wall 65 and extends laterally. Hanging tabs 68 and 69 are integrally formed of the elongated plate 66 of the carrying member 40 at the front portions of both ends of the plate, and these tabs abut with respective rear shoulders of the cassette when it is loaded in its recording or playback position as shown by an imaginary line in FIG. 3. An L-shaped lever 70 is pivoted at 72 to the front end of the side wall 63. A guide angle 73 is mounted along the wall 36 of the cassette lifting member 32 on the chassis plate 20 and is provided with guide grooves 74 at both longitudinal sides thereof (see FIG. 10) with which grooves a sliding plate 75 is slidably engaged. The sliding plate 75 has a longitudinal opening 76 with its opposite edges toothed so as to form racks 77 and 78. Upstanding members 81 and 82 are fixed in spaced relationship to each other on the upper face of the sliding plate 75, each of the members having slot 79 or 80 with its one end opened to loosely receive the guide pin 41. A pinion 83 is so located within the opening 76 of the sliding plate 75 that it can selectively engage with the racks 77 and 78 as hereinafter described. It is to be noted that the rack 77 is positioned in a longitudinally shifted relationship with respect to the rack 78.

Figures 5, 6, 7:
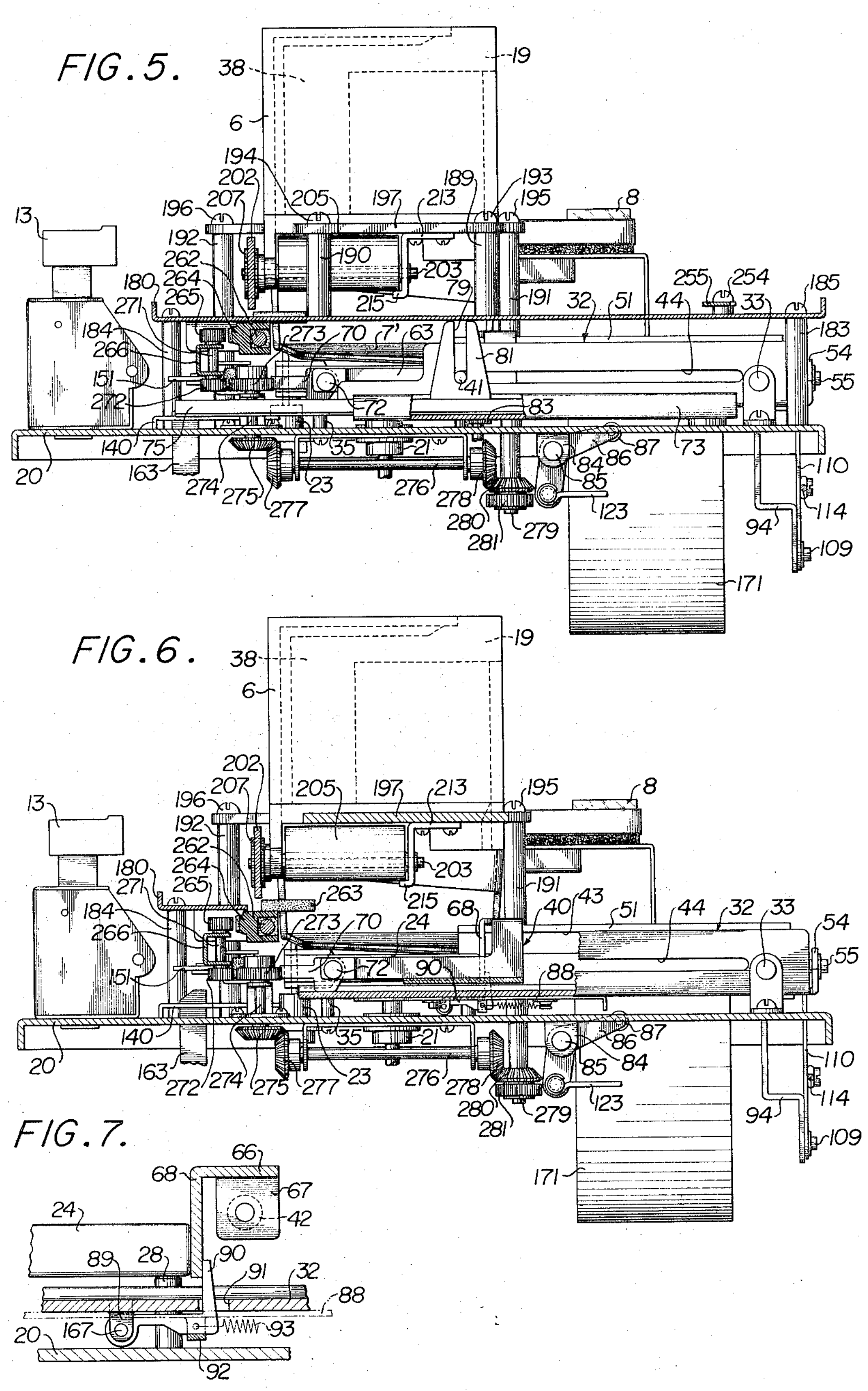
FIG. 5 is a sectional side view of the tape recorder taken along the line 5—5 of FIG. 3.
FIG. 6 is also a sectional side view of the tape recorder taken along the line 6—6 of FIG. 3.
FIG. 7 is an enlarged sectional view of the stopper as shown in FIG. 6.

An arm 86 is pivotably mounted at 85 to a bearing plate 84 secured to the chassis plate 20 as shown in FIG. 5, so that the arm 86 can be movable with respect to the plate 20. A roller 87 is rotatably attached to the end of the arm 86 and as the arm 86 is rotated counterclockwise in FIG. 5 by the action of a connecting rod as hereinafter described, the roller 87 pushes up the bottom of the lifting member 32 to lift the same. A sliding plate 88 is slidably mounted on the lower side of the lifting member 32 as seen from FIG. 6. Upon counterclockwise rotation of the arm 86, the sliding plate 88 is also pushed at its rear end by the roller 87 of the arm 86 and is moved forwardly. A hood-shaped stopper 90 is pivotably attached to a pair of downwardly hanging tabs 89 from the lifting member 32, as is clearly seen from FIG. 7, and when the stopper 90 is rotated counterclockwise to its full extend by a branch arm 92 extending laterally from the sliding plate 88, the tip portion of the stopper 90 will pass through an opening 91 of the member 32 to abut with the back surface of the hanging tab 68. The tip portion continues to abut the tab 68 as above mentioned so long as the branch arm 92 is positioned just below the thick part of the stopper 90, while the branch arm 92 will be displaced from its abutment positioned by the sliding of sliding plate 88 in the forward direction with the result that the stopper 90 will be rotated clockwise by the action of gravity with its tip portion disengaged from abutment with the tab 68. A tension spring 93 normally biases the sliding plate 88 rearwards (or rightwards in FIG. 6).

Figures 10, 11:
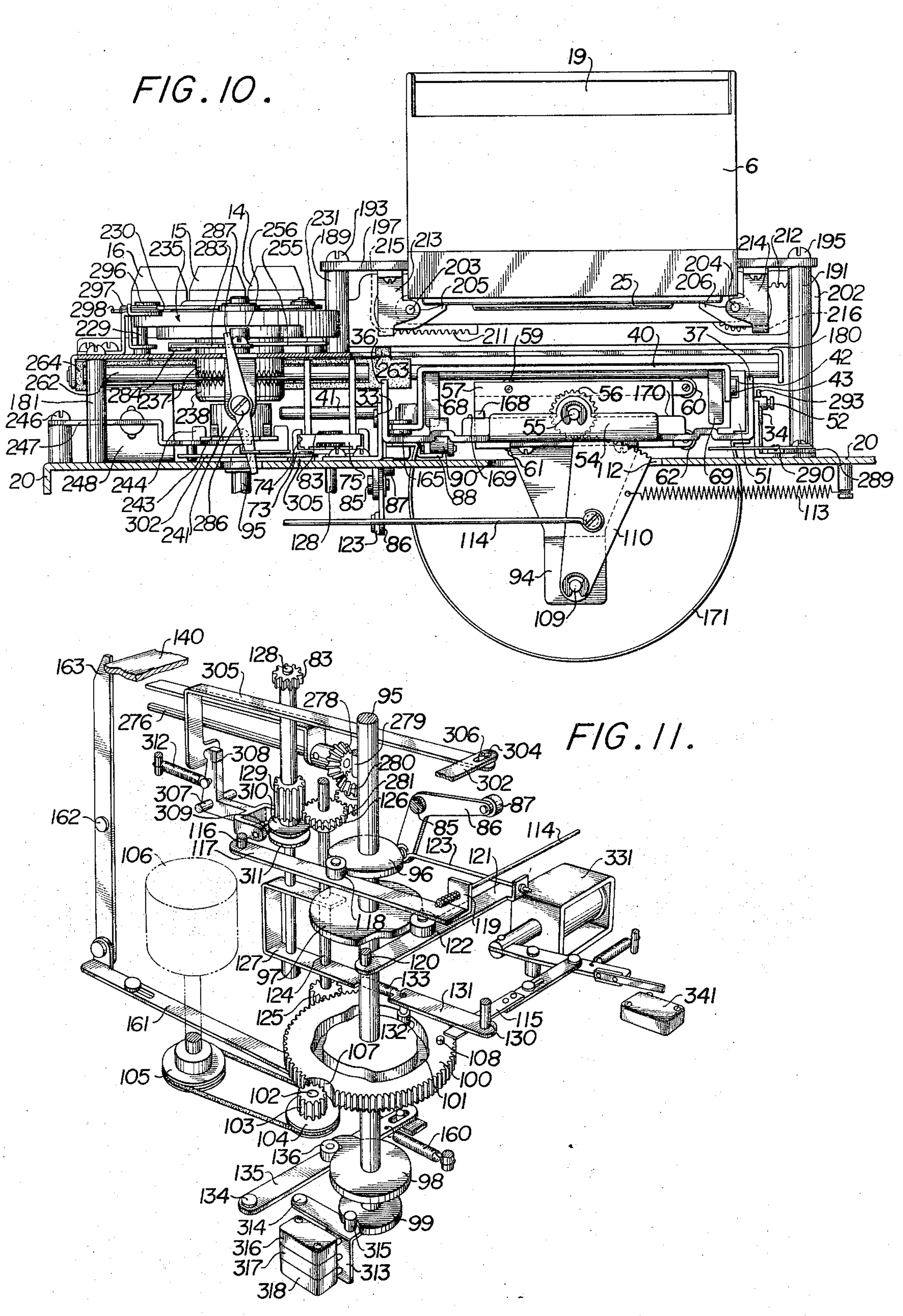
FIG. 10 is a rear sectional view of the tape recorder taken along the line 10—10 of FIG. 3.
FIG. 11 is a schematic perspective view of a driving mechanism for automatically turning over a cassette.

Turning to FIG. 11, there is shown a driving mechanism, principally comprising the hauling rod 114, arm 86 and pinion 83, which is a principal portion of the turning over mechanism of the present invention.

A shaft 95 is rotatably supported by the first chassis plate 20, to which shaft are secured four cam plates 96, 97, 98 and 99, and a gear 100 provided with a camming groove 101 on its upper face. Also rotatably secured to the chassis plate 20 is another shaft 102 to which a gear 103 is fixedly mounted engageably with the gear 100. The gear 103 is driven through pulleys 104 and 105 by a motor 106 shown by an imaginary line in FIG. 11. Rotation of the motor 106 is transmitted through the pulleys 104 and 105 and the gear 103 to the gear 100, thereby to rotate said group of the cam plates 96, 97, 98 and 99. The gear 100 is provided with a notch 107 on its peripheral surface to allow the cam plates to rotate only one time, and also with a projection 108 on the upper surface thereof. This projection 108 is pushed by an elongated plate 115 slidably mounted on the chassis plate 20 and actuated by a solenoid 331, thereby slightly rotating the gear 100 in either direction to engage with the gear 103. This mechanism enables the gear 100 to rotate only one revolution at a time. When the notch 107 of the gear 100 faces against the gear 103, the gear 100 disengages from the gear 103 and is stopped. A roller 118, which is rotatably mounted on an arm 117 pivoted at 116 to the chassis plate 20, is pressed against the periphery of the first cam plate 96. The arm 117 is provided at its one end with an upwardly bent portion 119 to which the hauling rod 114 is connected. The hauling rod 114 is adapted to be moved in its longitudinal direction as the arm 117 is rotated with respect to its rotating center 116 with rotation of the first cam plate 96. When the rod 114 is pulled leftwards in FIG. 11, the gear 110 is turned counterclockwise against the tension of the spring 113 thereby to rotate the receiver 57 clockwise in FIG. 10 by means of the gear 56 and the shaft 55.

A roller 122, which is rotatably mounted on an arm 121 pivoted at 120 to the chassis plate 20, is pressed against the periphery of the second cam plate 97. The arm 121 is connected at its one end to the end of the arm 86 by a connecting rod 123, and is adapted to turn with respect to its rotating center 120 with rotation of the second cam plate 97. Upon clockwise turning of the arm 121, the arm 86 is turned counterclockwise around its center 85 thereby lifting the lifting member 32. A shaft 124 is rotatably supported by the first chassis plate 20, to which shaft 124 is fixed a gear 125 in engagement with the gear 100. Additional gear 126 is secured to the shaft 124, and a U-shaped arm 127 is also rotatably arranged on the same shaft 124. Through one end of the arm 127 is pivotably and slidable penetrated a shaft 128 which carries the pinion 83 at its upper end, and a gear 129 and a pair of discs 310 and 311 at its middle part. The gear 129 has enough longitudinal length to engage with the gear 126 all the time. The other end of the U-shaped arm 127 is connected through a coil spring 133 with one end of an arm 131 pivoted at 130 to the chassis plate 20. This allows independent pivotable action of the U-shaped arm 127 and the arm 131. The arm 131 is provided at its lower side with a roller 132 which is adapted to engage with the camming groove 101 on the gear 100, and thus is moved clockwise or counterclockwise as the distance of the roller 132 from the shaft 95 is changed during rotation of the gear 100. This rotary movement is transmitted to the shaft 128 through the spring 133 and the U-shaped arm 127 with the result that the pinion 83 is selectively brought into engagement with the racks 77 or 78, or disengagement from either of these racks. A roller 136 provided on an arm 135 which is pivoted at 134 to the chassis plate 20, is pressed against the periphery of the third cam plate 98.

Figure 4:
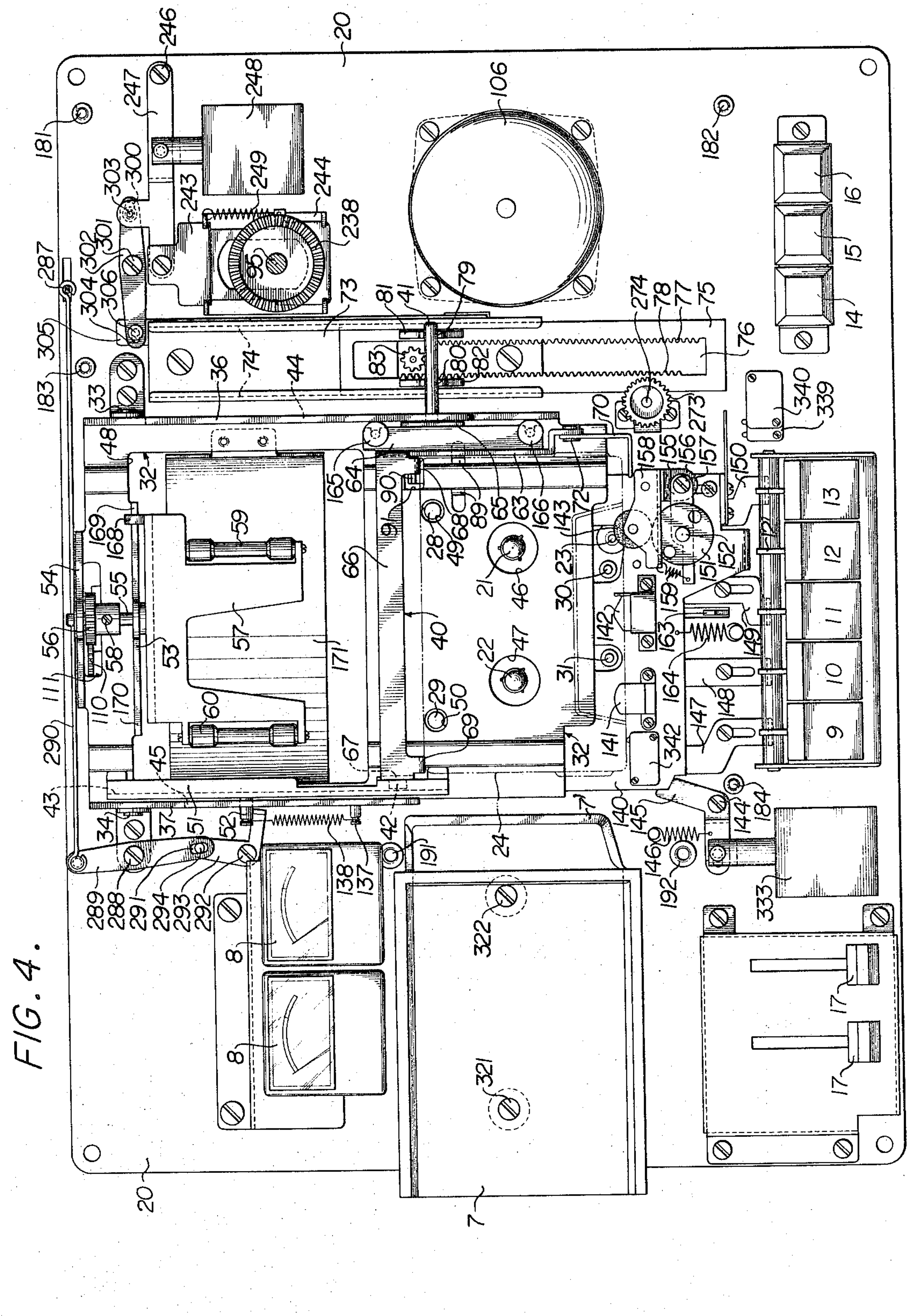
FIG. 4 is also a plan view of the tape recorder with its cassette discharging mechanism further removed.

As shown in FIG. 4, a head mount 140, mounting a conventional erase head 141, a recording/reproducing head 142 and a pinch roller 143, is slidably arranged on the chassis plate 20, and is provided at its front left hand side with a notch to cooperate with an L-shaped lever 145 pivoted at 144 to the plate 20. This lever 145 is biased counterclockwise by a spring 146 to lock the head mount 140 in the position where the heads 141, 142 and the pinch roller 143 cooperate with the magnetic tape contained in the cassette 24. Just before the end of one turn of the third cam plate 98, the roller 136 is moved away from the shaft 95 by a projection of the cam plate 98 and thus the arm 135 is turned counterclockwise resulting in a sliding arm 161 being moved longitudinally against a tension spring 160. As a result, an elongated arm 163 pivoted at 162 to the chassis plate 20 is turned clockwise thereby pressing the head mount 140 toward the rear of the tape recorder against a tension spring 164. The head mount 140 is then locked by the above mentioned locking means or the L-shaped lever 145 and the spring 146 in the engagement position with the tape as above described.

A shutter disc 151, which will be referred to hereinafter, is also mounted on the head mount 140 by means of a lever 155 and an angle 156, the lever 155 being able to rotate at a center 157, and is always in biasing contact with the pinch roller 143 due to a spring 159 in recording or playback mode. One end of the spring 159 is fixed to an arm 158 which mounts the pinch roller 143. The shutter disc 151 is adapted to rotate around its center 152 on the lever 155 and is provided with two holes 153 and 154 diametrically opposed to each other (see FIG. 2). A lamp 325 (not shown in FIG. 4, but shown in FIG. 2) is arranged above the shutter disc 151 and a photoconductive element 326 (not shown in FIG. 4, but shown in FIG 2) is arranged under the circular path to be formed by rotation of said pair of holes 153 and 154. With this structure, light from the lamp 325 is received by the photoconductive element 326 depending on the state of rotation of the shutter disc 151, as will be clear hereinafter.

Guide rollers 165 and 166 are fixed to the carrying member 40 for guiding the same along the wall 36 of the cassette lifting member 32.

Operation of the cassette turning over mechanism as above mentioned will be explained in the following disclosure.

Figures 8, 9:
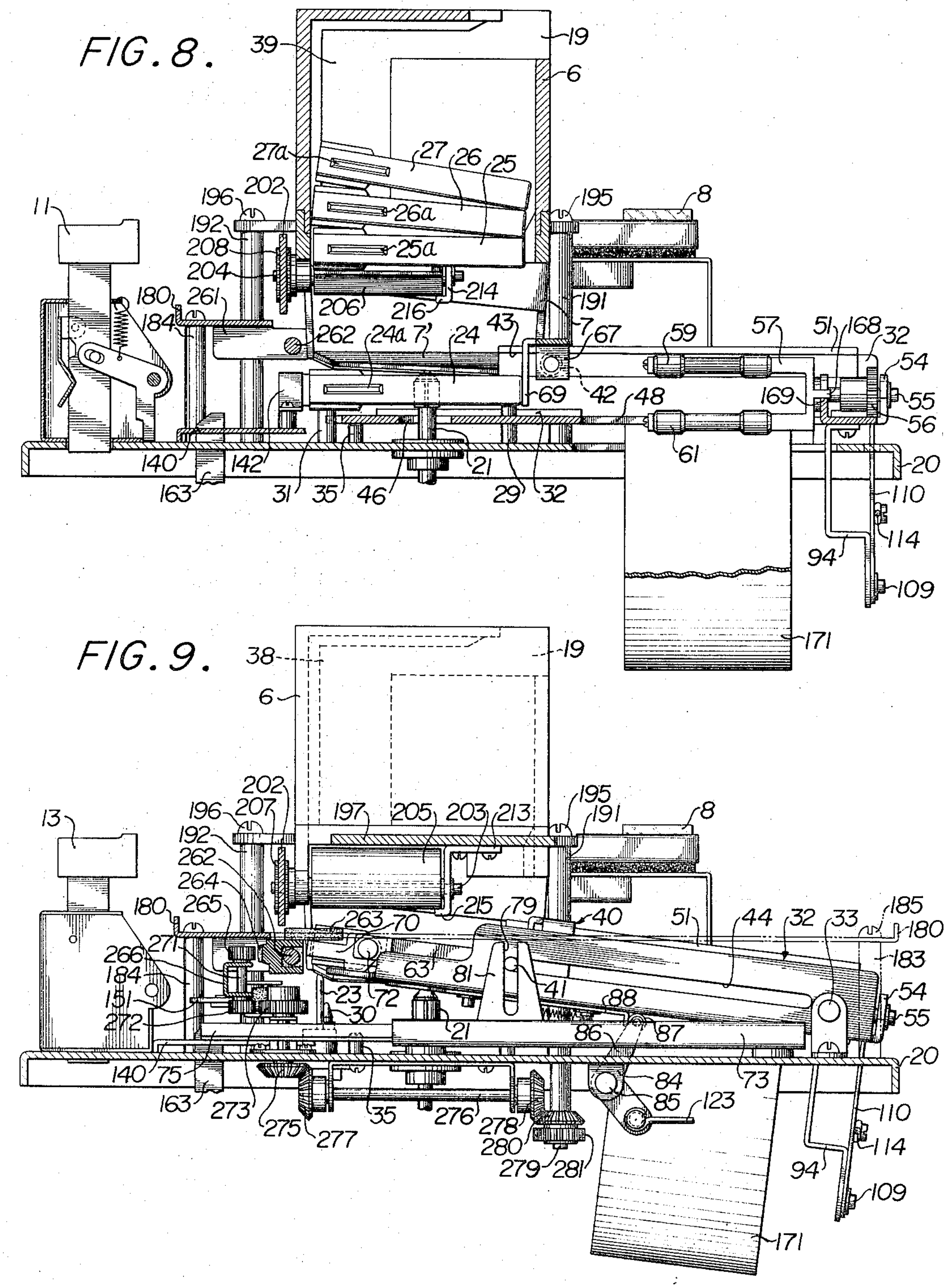
FIG. 8 is a sectional side view of the tape recorder taken along the line 8—8 of FIG. 3.
FIG. 9 is a view similar to FIG. 5 but in operative position.

To begin with, it is assumed that the cassette 24 is loaded in the normal recording or reproducing position, as clearly illustrated in FIG. 8, in which the cassette rests on the posts 28, 29 and 30, 31 and the capstan 23 and the reel spindles 21, 22 are passed through corresponding holes of the cassette respectively. In this state, when the elongated plate 115 is actuated by means described hereinafter to push the projection 108 for a moment, the gear 100 is also turned a little with the result that engagement is made between the gear 100 and the gear 103 and the gear 100 starts to be turned one revolution by the motor 106 through the gear 103. During this one turn of the gear 100 and hence of shaft 95, the arm 86 is turned counterclockwise through the connecting rod 123 and the and the arm 121 by the roller 122 rolling on the periphery of the cam plate 97, and therefore the roller 87 at one end of the arm 86 lifts up the lifting member 32 and at the same time causes the sliding plate 88 to move forwards (or leftwards in FIG. 6) against the tension spring 93. Thus, the cassette 24 is lifted up resting on the lifting member 32 and is disengaged from the reel spindles 21, 22, the posts 30, 31 and the capstan 23. As seen from FIG. 7, upon forward movement of the sliding plate 88, the branch arm 92 is forwardly (leftwardly in FIG. 7) displaced from its normal position in which the stopper 90 is maintained horizontally, and the latter will be turned clockwise by gravity with respect to the shaft 167. The stopper 90 is, therefore, disengaged from the back of the hanging tab 68 of the carrying member 40.

As the roller 132 is changed in its distance from the shaft 95 during rotation thereof, the arm 131 is swung around the center 130 and thus causes the U-shaped arm 127 to swing with respect to the fixed shaft 124 through the coil spring 133. This results in that the pinion 83 carried on the upper end of the shaft 128 is selectively engaged with the rack 77 or 78 of the sliding plate 75. If the pinion 83 engages with the rack 78, rotation of the gear 100 is transmitted through the gear 125, the shaft 124, the gears 126 and 129 and the shaft 128 to the pinion 83 and the sliding plate 75 having the racks 77 and 78 is driven rearwards or upwards in FIG. 4. Then the carrying member 40 is also slidably driven rearwards along the walls 36 and 37 of the lifting member 32 through the guide pin 41 connected to the carrying member 40 by the sliding plate 75. Upon sliding of the carrying member 40, the cassette resting on the lifting member 32 is carried rearwards on the member itself by the L-shaped lever 70 until the cassette reaches its turning over position. At this turning over position, the cassette 24 is brought in between the upper rollers 59, 60 and the lower rollers 61, 62 and is loosely supported therein, when the pinion 83 is brought into its neutral position where it is engaged neither with the racks 77 nor 78, responsive to the position of the roller 132 from the shaft 95. This means that the movement of the cassette in the rear direction has ceased. Subsequent to this, the first cam plate 96 urges the roller 118 and hence the arm 117, so that the hauling rod 114 is pulled in its longitudinal direction thereby turning the fan-shaped gear 110 counterclockwise against the action of the tension spring 113 around the center 109 as will be clearly seen from FIG. 10. Since the gear 110 is always engaged with the gear 56, the receiver 57 arranged in fixed relation with the gear 56 is also turned 180° clockwise in FIG. 10 until a stopping projection 168 bumps against one end portion 170 of the upstanding wall 53 of the lifting member 32. In this way, the cassette put between the rollers 59, 60 and 61, 62 is turned 180° to a turned over position. As the cassette is loosely supported by the rollers 59, 60 and 61, 62 of the receiver 57 so that the cassette can freely slide laterally between these rollers, one lateral side of the cassette is kept in contact with a cassette guide member 171 by gravity during the turning of the cassette. This is more advantageous than a possible structure in which the cassette is firmly supported in that the highest or the lowest point which the lateral side of the cassette will reach during the turning thereof can be vertically adjusted depending upon the overall height of the tape recorder.

With the cassette turned over 180° in this way, as the shaft 95 rotates, the camming groove 101 of the gear 100 causes the arm 131 to swing around the center 130 and thus the U-shaped arm 127 is also swung with respect to the fixed shaft 124. As a result, the pinion 83 is engaged with the rack 77, and at the same time is caused to rotate through the shaft 128, the gears 129 and 126, the shaft 124 and the gear 125 by the gear 100. The pinion 83, therefore, drives the sliding plate 75 together with the cassette carrying member 40 frontwards (or downwards in FIG. 4). The cassette, which has been previously turned over and is lying in the turned over position, is carried frontwards sliding on the lifting member 32 by the hanging tabs 68 and 69 of the carrying member 40 until the cassette is brought into a position where it is engageable with the reel spindles 21 and 22 and the capstan 23. When the cassette has reached such position, the pinion 83 is brought into the neutral position as above described depending on the position of the roller 132 from the shaft 95 and accordingly the sliding of the cassette in the front direction ceases. Coincidently with this, the hauling rod 114 returns to its initial state as the first cam plate 96 has just finished its turning substantially one revolution around the shaft 95, and the fan-shaped gear 110 is also returned to its initial state by the tension spring 113. Then the gear 56 which is always in engagement with the gear 110 is turned counterclockwise together with the receiver 57 fixedly secured thereto and is stopped when the stopping projection 168 previously kept in contact with the one end portion 170 of the upstanding wall 53 bumps against the other end portion 169 of the same wall 53. At the same time, the arm 86 is turned clockwise to lower the cassette lifting member 32 through the connecting rod 123 and the arm 121 by the roller 122 provided thereon and following the periphery of the second cam plate 97 during its turning, as is well understood by reference to FIG. 11. The cassette resting on the cassette lifting member 40 is engaged with the posts 28, 29 and 30, 31, the reel spindles 21, 22 and the capstan 23, when the lifting member 40 descends onto its lowermost position, that is, recording or playback position. In such a position, the roller 136 rotatably secured to the arm 135 is pressed by the peripheral projection of the third cam plate 98 and accordingly the head mount 140 is forced rearwards through the sliding arm 161 and the elongated arm and then locked by the L-shaped lever 145 in a position where the heads 141, 142 and the pinch roller 143 are in cooperative relation with the magnetic tape of the cassette. Responsive to this movement of the head mount 140 to its operative position, rotary driving is applied to the reel spindles 21 and 22 in the known manner and recording or reproducing of the cassette commences automatically. When the cassette has returned to its recording or reproducing position after being turned over, the notch 107 of the gear 100 is again facing the gear 103 and therefore rotation of the cam plates 96, 97, 98 and 99 ceases.

Next, the cassette discharging mechanism as above outlined and the cassette loading mechanism will be described in detail by references to the associated drawings.

Figure 3:
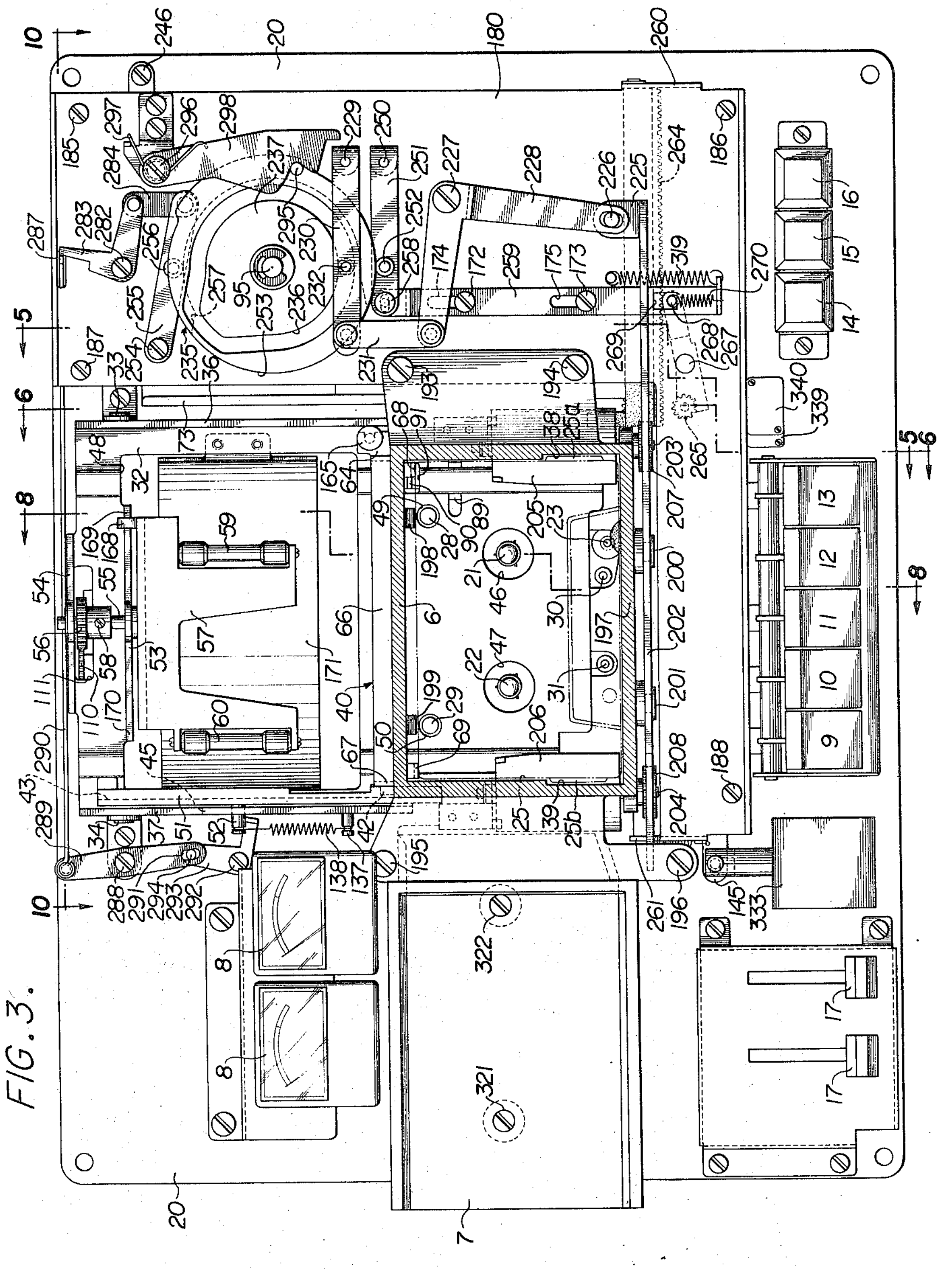
FIG. 3 is a plan view of the tape recorder with its upper cover plate removed.

Referring to FIG. 3, the second chassis plate 180 is fixed to the first chassis plate 20 by means of supporting posts 181, 182, 183 and 184 (see FIG. 4) and screws 185, 186, 187 and 188. A fixing mount 197, to which the guide case 6 is detachably mounted in a conventional manner, is secured to the second chassis plate 180 and the first chassis plate 20 by means of supporting posts 189, 190 and 191, 192 and screws 193, 194 and 195, 196, respectively. The cassette guide case 6 is provided on its inner lateral side walls with L-shaped grooves 38 and 39 which serve as a guide for the cassette in such a manner that a pair of elongated projections 24a and 24b formed on both lateral outer sides of the cassette are guided by the grooves 38 and 39 respectively when the cassette is inserted into the guide case 6 through a rear opening 19 (see FIG. 1). The fixing mount 197 is also provided on the inner rear wall with a pair of projections 198 and 199 each of which slopes downward. These projections 198 and 199 act to slide the cassette frontwards while the same is falling onto recording or reproducing position, thereby attaining appropriate positioning of the cassette.

Figures 12, 13, 14, 15:
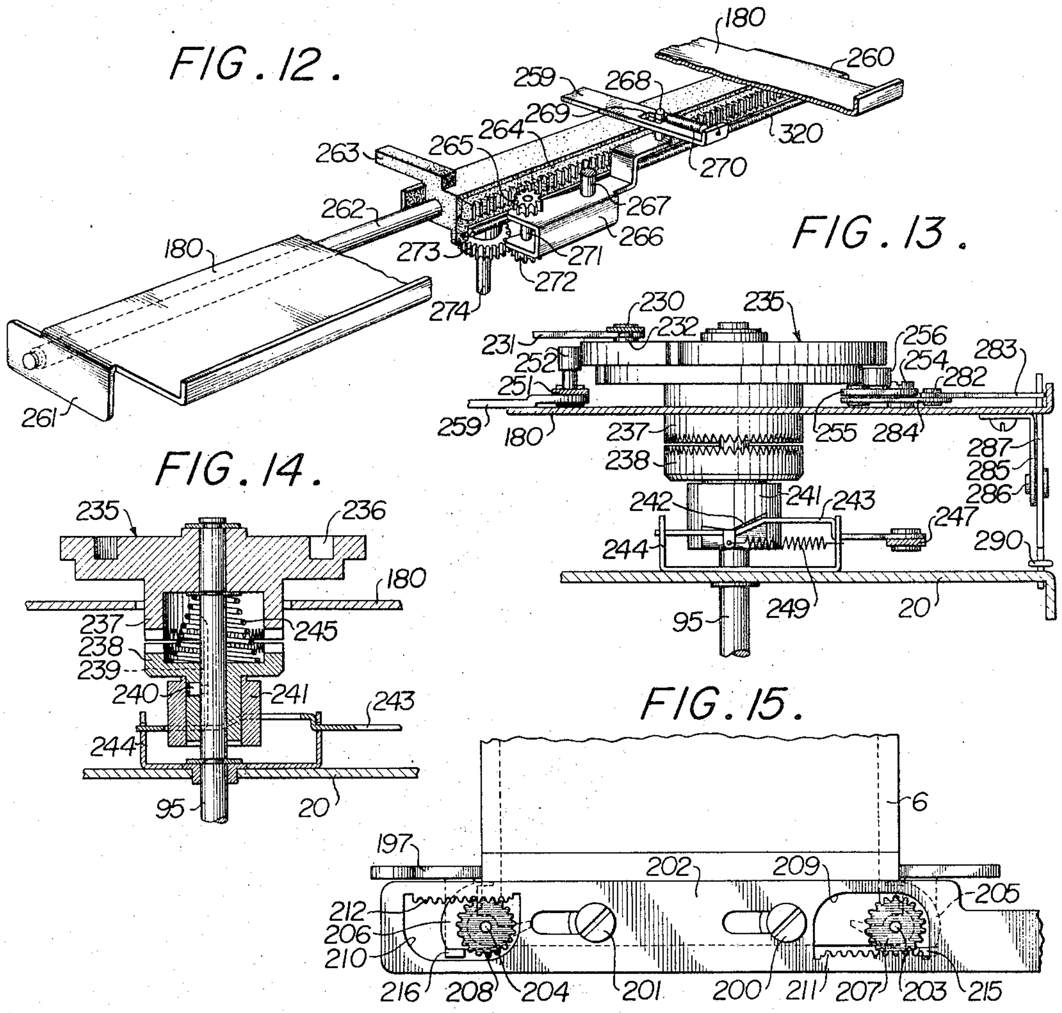
FIG. 12 is a perspective view of a part of the cassette discharging mechanism.
FIG. 13 is an enlarged side view of a clutch used in the cassette discharging mechanism.
FIG. 14 is an enlarged sectional view of the clutch of FIG. 13.
FIG. 15 is a front view of the principal portion of a cassette loading mechanism.

A driving plate 202 is slidable secured to the front wall of the fixing mount 197 by screws 200 and 201 passed through slots provided on the plate 202, as seen from FIG. 15. Rotatably mounted on both lateral ends of the front wall of the fixing mount 197 are shafts 203 and 204 to which cassette holding members 205 and 206 are fixedly secured, respectively. These cassette holding members 205 and 206 are respectively formed of partially hollowed out cylindrical members. Gears 207 and 208 are secured to the front ends of the shafts 203 and 204, respectively. The driving plate 202 is provided at its two spaced parts corresponding to said gears 207 and 208 with slots 209 and 210 which have racks 211 and 212 along the sliding direction of the plate respectively on opposite inner edges thereof, said racks 211 and 212 being always engaged with said gears 207 and 208, respectively. The holding members 205 and 206 are adapted to turn in the opposite directions to each other, namely one in the clockwise direction and the other in the counterclockwise direction and vice versa, when the driving plate 202 slides in either direction. The rear end of the shafts 203 and 204 are pivoted to supporting angles 213 and 214 respectively, both of which are secured to the lower side of the brims of the fixing mount 197. Front lower ends of these supporting angles 213 and 214 are forwardly bent to provide stoppers 215 and 216, respectively, which will serve to limit the rotation of the cassette holding members 205 and 206 as will be described hereinafter.

The holding members 205 and 206 are respectively formed of a cylindrical member which is hollowed out inwardly with the first holding portions 217 and 218 and the second holding portions 219 and 220 left as they are. The first and the second holding members which include arcuate resting portions 221 and 222 are capable of a motion toward one another. The driving plate 202 and the cassette holding members 205 and 206 constitute a cassette loading mechanism of the invention together with the gears 207 and 208, the operation of which mechanism will be explained hereinafter.

Turning again to FIG. 3, a pin 226 is studded on a tab 225 horizontally extending from one end of the driving plate 202, and passed through a slot provided on one end of an L-shaped arm 228 pivoted at 227 to the second chassis plate 180. The other end of the arm 228 rotatably connected to one end of a link 231 and the other end of which is also rotatably connected to one end of a pivoting arm 230 pivoted at 229 to the second chassis plate 180. The pivoting arm 230 is provided at its lower side with a roller 232 to be engaged with a camming groove 236 formed on the upper surface of the cam device 235 which will be described in more detail hereinafter.

The cam device 235 is freely rotatably, but not longitudinally slidably, secured to the shaft 95 and has at its lower end a gear portion which provides an upper clutch portion 237 of the clutch. Lower clutch portion 238 of the clutch is also fixedly secured to the shaft 95 but can slide up and down along the shaft through a pin 250 and an axial groove 239. A sleeve 241 is rotatably arranged around the lower clutch portion 238. This sleeve 241 has two shoulders on its diametrically opposed peripheral portions, one of which is indicated as 242, each shoulder being formed by grinding off a portion of the sleeve. The shoulders rest on a stepped sliding plate 243 which is slidably mounted on the first chassis plate 20 through a U-shaped guide member 244 and is always biased rightwards in FIG. 13 by a spring 249. A coil spring 245 is disposed between the upper and the lower clutch portions so that the shoulders 242 always press against the stepped sliding plate 243. Rotatably connected tthe sliding plate 243 is an arm 247 which is pivotably mounted at 246 to the chassis plate 20 as shown in FIG. 4. Upon energization of a solenoid 248 mounted on the chassis plate 20, the arm 247 is turned counterclockwise thereby actuating the stepped sliding plate 243 leftwards in FIG. 13 against the action of the spring 249, and then the lower clutch portion 238 is caused to move up against the coil spring 245 by the shoulders 242 forced by the stepped portion of the stepped sliding plate 243. As a result, the lower clutch portion 238 is engaged with the upper clutch portion 237 with the result that the cam device 235 is turned by the shaft 95.

The cam device 235 has on its upper face the camming groove 236 with which the roller 232 is engaged, a camming periphery 253 against which a roller 252 fixed to the upper side of an arm 251 pivoted at 250 to the second chassis plate 180, is always pressed by a spring 270, and another camming periphery 257 against which a roller 256 fixed to the lower side of the pivoting arm 255 pivoted at 254 to the chassis plate 180, is always pressed by a tension spring 138 which will be referred to hereinafter. A sliding link 259, one end of which is rotatably connected at 258 to one end of the arm 251, is guided by a pair of pins 172 and 173 studded on the second chassis plate 180 and passing through a corresponding pair of slots 174 and 175 respectively, to linearly slide on the plate 180.

A guide rail 262 stretches from a right hand side bent portion 260 of the second chassis plate 180 to a left hand side bent portion 261 as seen from FIG. 12, to which rail is slidably mounted a rack 264 provided at one end thereof with a discharging member 263 for discharging the cassette from its recording or reproducing position. An arm 266, which carries a pinion 265 adapted to be selectively engageable with said rack 264, is pivotably mounted on the chassis plate 180 by a shaft 267. A pin 268 secured to one end of the arm 266 passes through an opening provided on the chassis plate 180 and a slot 269 provided on the sliding link 259, and a spring 270 is arranged between the pin 268 and the extreme end of the sliding link 259. With the arrangement as above mentioned, when the arm 251 is turned counterclockwise in FIG. 3 upon actuation of the cam device 235, the arm 266 is also turned clockwise with respect to its shaft 267 through the sliding link 259 and the spring 270 and then engagement is made between the pinion 265 and the rack 264. At this time, another gear 272 fixedly secured to a shaft 271 also engages with a gear 273 which is secured to a shaft 274 pivoted to the first chassis plate 20. As is clearly shown in FIGS. 9 and 11, rotary driving force is transmitted from the shaft 124 through the gears 126 and 281, a bevel gear 280, another bevel gear 278 engaging therewith, a shaft 276, a bevel gear 277 fixed to one end of the shaft, a bevel gear 275 engaging therewith and the shaft 274 to a gear 273. The gears 280 and 281 are secured to the lower end of a shaft 279 which is rotatably mounted on the chassis plate 20. The rack 264 is driven by selective engagement made between the gear thus driven and the gear 272 and between the pinion 265 and the rack itself.

It will be seen from FIG. 3 that one end of the pivoting arm 255 is rotatably connected to one end of the link 284, the other end of which is also rotatably connected to one end of the L-shaped pivoting arm 283 pivoted at 282 to the second chassis plate 180. Secured to the back surface of the second chassis plate 180 is an angle 285 to which a swinging arm 287 is pivoted at 286, as will be understood from FIGS. 10 and 13. The swinging arm 287 extends upwards a little beyond the chassis plate 180 so that the upper end thereof may cooperate with the end of the L-shaped pivoting arm 283. The lower end of the arm 287 is connected through a linking rod 290 to one end of an arm 289 pivotably mounted at 288 to the first chassis plate 20 as shown in FIG. 3. A pin 294 provided at one end of an L-shaped arm 293 which is pivoted at 292 to the chassis plate 20, passes through a slot 291 provided on the other end of the arm 289, and the other end of the L-shaped arm 293 extends upwards to as to engage with the guide pin 52.

With the arrangement as above mentioned, when the pivoting arm 255 is caused to turn counterclockwise in FIG. 3 as the cam device 235 is actuated, the end of the L-shaped pivoting arm 283 pushes the upper end of the swinging arm 287 leftwards in FIG. 3 and then the lower end thereof is moved leftwards in FIG. 10. As a result, the arm 289 shown at the left hand side of FIG. 3 is turned clockwise by the linking rod 290, thereby turning the L-shaped arm counterclockwise around its pivotable center 292. This causes the guide pin 52 to move rearwards and thus the sliding member 51 is also moved rearwards. This means that the passage through which the cassette is discharged as hereinafter described will be opened.

A pin 295 is studded at a marginal position on the upper face of the cam device 235 and is adapted to engage with a notch of an arm 298 pivoted at 296 to an angle secured to the second chassis plate 180, the arm 298 being always biased by a biasing spring 297 against the pin 295 in the stationary state of the cam device 235. This arm 298 serves to determine the exact position where the cam device 235 is stopped after its single rotation. Referring again to FIG. 4, a swinging arm 302 pivoted at 301 to the chassis plate 20 has two slots 300 and 304 fixed at its either ends, the former of which is engaging with a pin 303 fixed to the projection portion of the arm and the latter of which is engaging with a pin 306 fixed to one end of a sliding plate 305 slidably mounted on the chassis plate 20. The other end of the sliding plate 305 is downwardly bent and positioned to be normally in contact with an upper end of an L-shaped seesaw member 308 which is rotatably mounted through a shaft 307 to the first chassis plate 20. The other end of the seesaw 308 is forked into two branches between which a rod 309 is bridged. This rod is arranged to be positioned between a pair of discs 310 and 311 both fixed to a sleeve freely slidably disposed around the shaft 128.

With this structure as above described, when the solenoid 248 shown in FIG. 4 is energized, the seesaw member 308 is turned against a spring 312 through the arm 247, the swinging arm 302 and the sliding plate 305 and then the rod 309 fixed to the end of the seesaw member 308 pushes down the lower disc 311 and in turn the sleeve. Accordingly, the pinion 83 is also lowered so that it may not engage with either one of the racks 77 or 78 of the sliding plate 75.

An arm 313 is pivotably mounted at 314 on the first chassis plate 20 and is provided at its upper face with a pin 314 always contacting with the periphery of the fourth cam plate 99. The arm 313 acts to close switches 316 and 317 during the rotation of the shaft 95 and hence the cam plate 99, thereby increasing voltage to be applied to the motor 106 and supplying energizing current to the solenoid 248 as will be described hereinafter.

Operation of the cassette exchange mechanism is as follows.

A plurality of cassettes, for example four cassettes 24, 25, 26 and 27, are inserted through the opening 19 provided at the rear side of the guide case 6, and guided by the L-shaped grooves 38 and 39. Assuming that the lowermost cassette 24 is in the normal recording or reproducing position, when the magnetic tape contained in the cassette has completely wound on one of the reels and the rotation of the tape reels is stopped, the projection 108 provided on the gear 100 is temporarily pushed away by the elongated plate 115 which is actuated by means hereinafter described in substantial coincidence with the stoppage of the tape travel, and the gear 100 is caused to engage with the gear 103. While the gear 100 is thus turned, the solenoid 248 is energized by the switch 317 closed by the arm 313, and engagement is thereby made between the upper clutch portion 237 and the lower clutch portion 238 with the result that the cam device 235 is turned together with the shaft 95. At the same time, the swinging arm 302 is turned clockwise and the sliding plate 305 is moved upwardly in FIG. 4, one end of which in turn pushes the upper end of the seesaw member 308 to turn it with respect to the shaft 307. As a result, the lower disc 311 is lowered and therefore the pinion 83 is brought down into a position in which it is disengaged from the racks 77 and 78.

Figure 16:
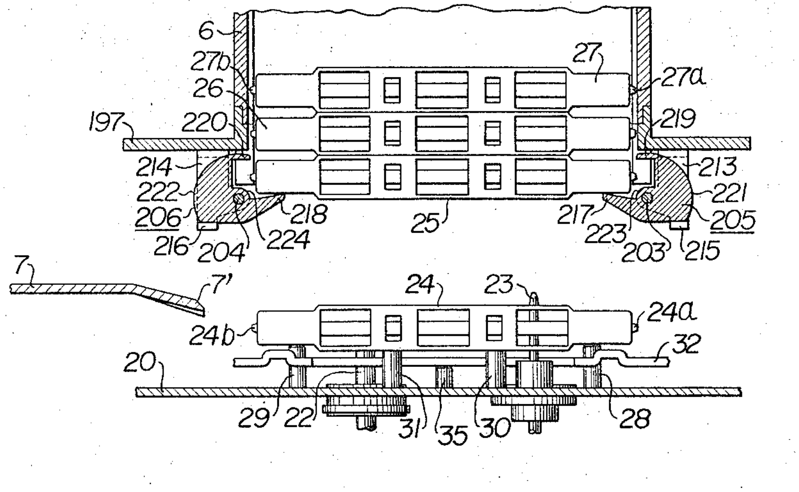
FIGS. 16 through 19 are schematic views showing loading operation of the cassette in a stepwise manner.

During the rotation of the shaft 95, on the other hand, the cassette lifting member 32 is lifted by the arm 86 actuated by the cam plate 97, and the cassette 24 resting on the lifting member 32 is also lifted therewith from the position as shown in FIG. 16 so that the reel spindles 21 and 22 may disengage from the cassette.

Referring to FIG. 3, when the pivoting cam 255 is turned by the roller 256 provided thereon which is moved along the camming periphery 257 of the cam device 235 upon rotation thereof, the guide pin 52 shown at left hand side of the drawing is driven rearwards against the tension spring 138 by the L-shaped arm 293 which is turned by the lever 289 through the linking rod 290, the swinging arm 287, the L-shaped pivoting arm 283 and the link 284. The sliding member 51 is also retracted rearwards together with the guide pin 52 to provide an opening through which the cassette is discharged.

Figure 17:
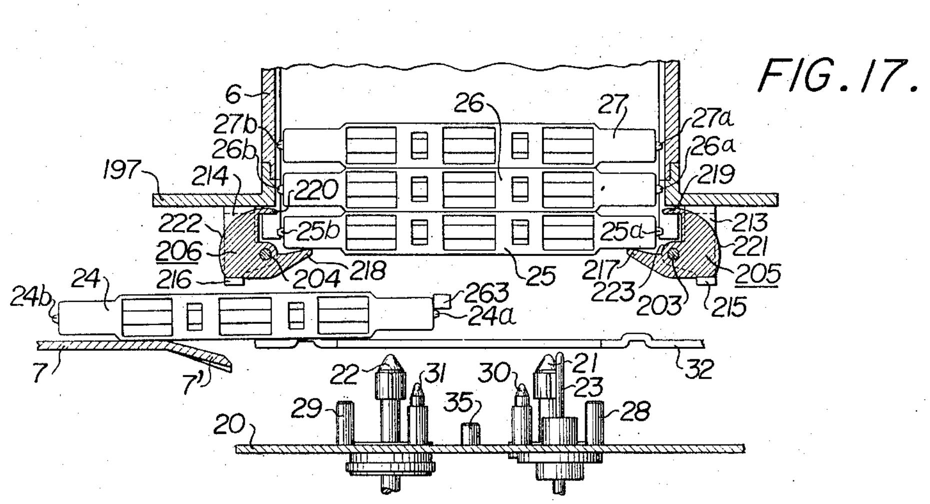

Upon rotation of the cam device 235, the pivoting arm 251 is also turned counterclockwise around its pivoting center 250 by the roller 252 provided thereon, and therefore the sliding link 259 is moved frontwards against a tension spring 319. Then by this sliding motion, the arm 266 is turned through the spring 270 and engagement is made between the pinion 265 and the rack 264 and between the other gear 272 and the gear 273. Thus, the rack 264 is linearly moved along the guide rail 262 against a tension spring 320 through the pinion 265, the gears 272, 273, the shaft 274, the bevel gears 275, 277, the shaft 276, the bevel gears 278, 280, the gear 281 (see FIG. 5), the gear 126, the shaft 124, the gears 125 and 100, the gear 103 and the driving motor 106 (see FIG. 11). The cassette 24 is thus discharged through the opening provided by the retraction of the sliding member 51 as above mentioned, by the discharging member 263 integrally formed with the rack 264 as is shown in FIG. 17. The cassette 24 thus discharged is guided into the guide case 7, which is fixed by screws 321 and 322 on the first chassis plate 20. The guide case 7 has a tilted portion 7' which serves to facilitate the reception of the cassette discharged from the tilted lifting member 32 into the guide case 7, as will be understood from FIGS. 16 and 17.

After discharging the cassette 24 from its normal recording or playback position as above described, the pinion 265 disengages from the rack 264 and the latter will return to its initial position by the tension spring 320. At the same time, the sliding member 51 is returned to its initial state by means of the tension spring 138 and accordingly the passage through which the cassette is discharged is partly closed.

Figure 18:
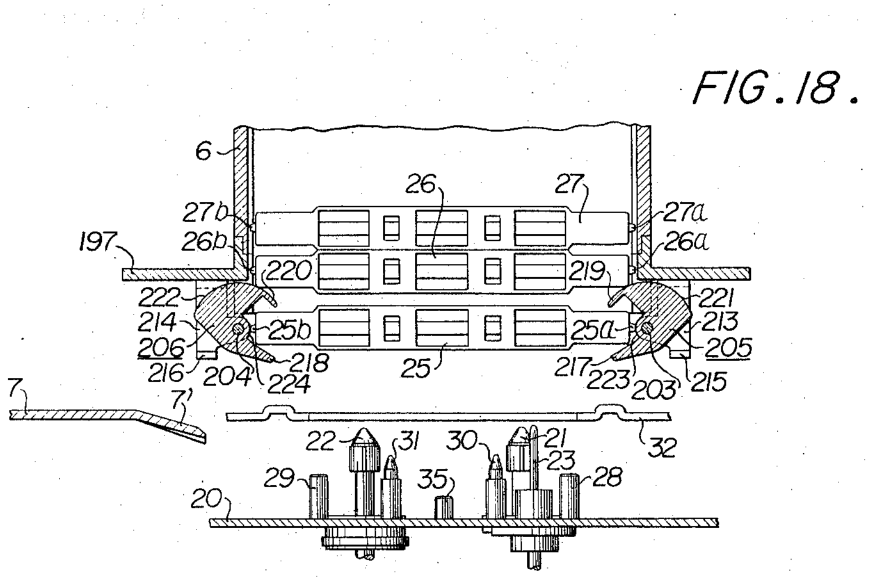

Upon rotation of the cam device 235, the pivoting arm 230 is turned with respect to its pivoting center 250 by the roller 232 provided thereon and moving in engagement with the camming groove 236 of the cam device 235, and then the L-shaped arm 238 is turned around its pivoting center 227. As a result, the driving plate 202 is moved along its longitudinal direction, thereby turning respective cassette holding members 205 and 206 through the racks 211 and 212 provided on the inner edges of the slots 209 and 210 and the gears engaging therewith, respectively, as will be seen from FIG. 15. The cassette holding members 205 and 206 are turned as shown in FIGS. 16 through 19 in the stepwise manner wherein in FIGS. 16 and 17, the next to lowermost cassette 25 is held by the first holding portions 217 and 218 of the cassette holding members 205 and 206, respectively. When the cassette holding members 205 and 206 are turned by the driving plate 202 as mentioned above, the second holding portions 219 and 220 go into the space provided between the cassettes 25 and 26 as shown in FIG. 18. Upon further turning of the cassette holding members 205 and 206, the cassette 25 falls onto the lifting member 32 which is in its highest position. Such turning of the holding members 205 and 206 is limited by the stoppers 215 and 216, respectively, both of which are formed at the lower ends of the supporting angles 213 and 214, respectively. During the period within which the holding members 205 and 206 turn from the position shown in FIG. 18 to that shown in FIG. 19, the cassette 26 always rests on the arcuate resting portions 221 and 222 and is maintained at a constant level regardless of the turning of the holding members 205 and 206. Furthermore, in the course of loading of the cassettes as shown in FIGS. 16 through 19, the elongated projections, for example, 25a and 25b formed on the lateral sides of the cassette 25 are always held by rounded core portions 223 and 224 of the holding members 205 and 206 in close contact therewith. This is effective in exactly determining the position onto which the cassette will fall.

Figure 19:
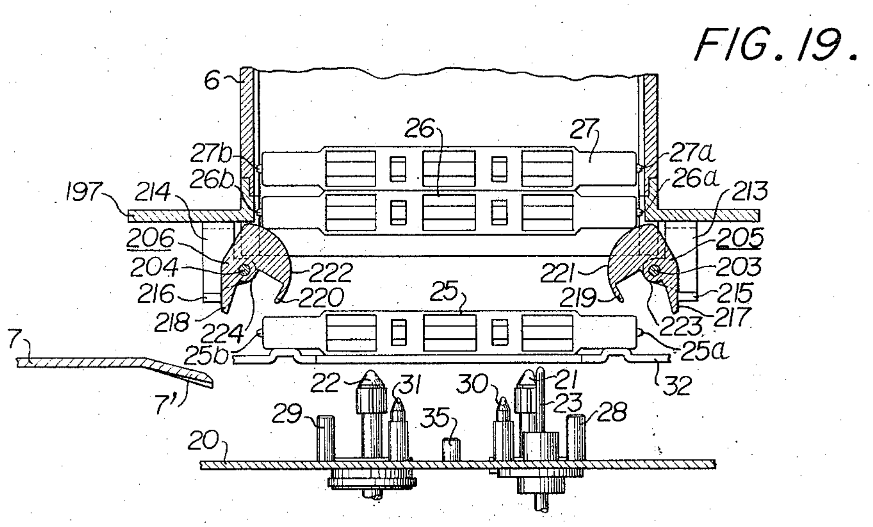

At the extreme right position of the driving plate 202, the cassette 25 falls onto the cassette lifting member 32 as shown in FIG. 19 and, shortly thereafter, when the cassette holding members 205 and 206 return to their normal position as shown in FIG. 16, the cassette 26, which has been held by the second holding portions 219 and 220 so far, gets out of such position and falls onto the first holding portions 217 and 218 of the holding members 205 and 206. At the same time, the cassette lifting member 32 holding the cassette 25 thereon descends according to the rotation of the cam device 235 and thus the cassette 25 is brought into normal recording or playback position.

An automatic control circuit for use with the cassette exchanging mechanism and the cassette turning over mechanism both above described will be explained with reference to FIG. 2.

Referring now to this drawing, the shutter disc 151 is adapted to make resilient contact with the pinch roller 143 for rotation therewith and, upon rotation, light emitted from the lamp 325 and projecting onto the photoconductive element 326 is intermittently interrupted by the shutter disc. Resulting electrical resistance of the element 326 changes in response thereto with the result that the voltage across the element 326 changes correspondingly. This voltage variation is transmitted through a capacitor C1 to a rectifying circuit 327 where such variation is rectified. The rectified signal is fed to a Schmitt circuit 328 consisting of transistors Tr1 and Tr2, the latter (Tr2) being in its "off" state during rotation of the pinch roller 143. A monostable multivibrator 329 which is of conventional structure is fed by an output from the Schmitt circuit 328. When the rotation of the shutter disc 151 ceases and the transistor Tr2 is switched from its off state to its "on" state, a stable pulse is obtained at the output of the monostable multivibrator 329. This output signal passes through a misoperation preventing circuit 330 hereinafter described, and a capacitor C2 to a transistor Tr3 and turns on the same temporarily which in turn turns on another transistor Tr4. As a result, current flows through a solenoid 331 and energizes it. Upon energization of the solenoid 331, the projection 108 provided on the gear 100 is pushed away by the elongated plate 115 as described by reference to FIG. 11.

The misoperation preventing circuit 330 is provided to prevent the transistor Tr3 from turning on due to base current thereof flowing through the capacitor C2 when the power source is switched on.

A bistable multibibrator 332, which includes a pair of transistors Tr5 and Tr6, is switched over by charging current flowing into the capacitor C3 from a power source through the switch 317 which takes the position indicated by a broken line upon stoppage of rotation of the fourth cam plate 99 as described above with reference to FIG. 11. The switch 317 takes another position indicated by a solid line during rotation of the fourth cam plate 99. If, for example, the transistor Tr6 is in its off state, a transistor Tr9 will be in its on state because the base thereof is not grounded through the transistor Tr6, and in turn a transistor Tr10 will be in its off state. This results in no current flowing through the solenoid 248 which was referred to with reference to FIG. 4.

A transistor Tr11 acts as a switching transistor whose base is grounded through the switch 317 during rotation of the fourth cam plate 99 thereby turning off the transistor. This transistor Tr11 switches to its on condition when the fourth cam plate 99 stops its rotation, and then a transistor Tr12 will have its base grounded through the transistor Tr11. When the transistor Tr12 is switched off in this way, charging current for a capacitor C4 will flow into the base of the transistor Tr13 thereby turning the same on and energization current will flow through the solenoid 333. The solenoid 333 thus energized turns the L-shaped lever 145 against the spring 146 and then the head mount 140 is returned by the tension spring 164 to its inoperable position.

Explanation will be made of the overall mechanism of the preferred embodiment of the present invention by reference to the circuit diagram as shown in FIG. 2.

To begin with, a plurality of cassettes, for example, four cassettes 24, 25, 26 and 27, are inserted through the opening 19 into the guide case 6 so that the lowermost one may be held by the first holding portions 217 and 218 of the cassette holding members 205 and 206 respectively. Upon depression of the power button 16 or switching on of the power switch 334 in FIG. 2, voltage is induced in a transformer 336 from the alternating current power source 335 and driving current is supplied to the driving motor 106 through the switch 316 which is in the position as shown by a broken line in FIG. 2 during rotation of the fourth cam plate 99. It is to be noted that the voltage induced by the transformer 336 is also applied to the solenoids 248, 333 and 331 and a reproducing amplifier 337.

Upon instantaneous switching of a switch 338 from the position as shown by a solid line to that as shown by a broken line in FIG. 2, said switch being a manual one for discharging a cassette and loading the next cassette, the base of the first transistor Tr5 of the bistable multivibrator 332 and the input of the monostable multivibrator 329 are grounded through the switch 338 and the transistor Tr11 which is in its off state and thus the second transistor Tr6 of the bistable multivibrator 332 switches on. As a result, the transistor Tr9 turns off and the transistor Tr3 turns on during the period corresponding to the width of the output pulse from the monostable multivibrator 329. This results in that:

a. The transistor Tr7 turns on and in turn the transistor Tr8 turns off. Since the transistor Tr9 is also in its off state, the transistor Tr10 switches on and energization current will flow through the solenoid 248.

b. The transistor Tr13 turns on and energizing current will flow through the solenoid 333.
c. The transistor Tr4 turns on and energizing current will also flow through the solenoid 331.

Upon energization of the solenoid 333, the head mount 140 is returned to its inoperative position as above described and, in connection with this, transmission of driving force to the reel spindles 21 and 22 is cut off. The switch 339 is switched off due to such rearward movement of the head mount 140 as is clearly shown in FIG. 4 and the switch 340 is changed over from the position shown by a solid line to that shown by a broken line in FIG. 2. Such changing over of the switch 340 allows substantially the same input to be applied to the Schmitt circuit 328 through the switch 340 as that obtained when the shutter disc 151 is turning in contact with the pinch roller 143. This is effective in preventing misoperation of the Schmitt circuit 328 which may mistakenly operate upon a stoppage of rotation of the shutter disc 151 due to disengagement from the head mount 140 rather than the finish of winding of the magnetic tape on one of the reels of the cassette.

Energization of the solenoid 248 causes the lower clutch portion 238 to engage with the upper clutch portion 237 whereby the cam device 235 is rotated by the shaft 95. Energization of the solenoid 331 causes the elongated plate 115 to push against the projection 108 whereby the gear 100 starts to rotate, and at the same time the switch 341 is maintained in closed condition during the energization period. During one turn of the gear 100, the switches 316 and 317 are operated as above described and the switch 318 is closed. Switching of the switch 317 allows the base of the transistor Tr8 to be grounded through the switch, and thus the energization of the solenoid 248 is continued. During this rotation of the gear 100, the cassette is discharged and the next new cassette is brought into its normal recording or reproducing position. Coincidently with the stopping of the gear 100, the switch 317 returns to the position shown by a solid line in FIG. 2, and then charging current will flow into the capacitor C3. This current provided an input signal to switch the bistable multivibrator 332 to another stable state in which the transistor Tr6 is in its off state.

In the course of playback of the magnetic tape, when the tape has been completely wound on one of the reels and the shutter disc 151 has been stopped, the transistor Tr3 is switched on, as described above, and energizing current flows through the solenoids 331 and 333. In the bistable multivibrator 332, however, the transistor Tr6 is in its off state and in connection therewith the transistor Tr9 is also in its off state. As a result, in spite of the transistor Tr7 which has been switched on, no energizing current will flow through the solenoid 248. With the solenoid 248 deenergized, the cam device 235 is disengaged from the shaft 95 and thus the cassette turning over operation is begun by energization of the solenoid 331. Playback operation is successively effected after such turning over operation. In coincidence with the stoppage of rotation of the gear 100, the switch 317 is switched to the position as indicated by a solid line in FIG. 2, and therefore the bistable multivibrator 332 is switched to another stable condition in which the transistor Tr6 is in its on state. Under this condition, when the magnetic tape has been completely wound on one of the reels, energizing current flows through all of the solenoids 248, 331 and 333 and the cassette discharging mechanism including the cam device 235 acts to discharge the cassette into the guide case 7 through its tilted portion 7' and the next cassette is newly loaded.

In this way, the four cassettes 24, 25, 26 and 27 as loaded in this order are automatically handled one after another in such a manner that recording or reproducing is effected with respect to both sides of each cassette and they are thereafter discharged. Just before the gear 100 finishes its rotation for discharging the last cassette, the head mount 140 is brought into operative position by the third cam plate 98 and the associated members such as the roller 136, the sliding arm 161 and the elongated arm 163, but in fact as there is no cassette in the formal recording or reproducing position, the heads 141, 142 and the pinch roller 143 do not cooperate with anything. The switch 342 also mounted on the head mount 140 is normally closed and is opened when it is pushed by a front shoulder of the cassette if loaded in the formal recording or reproducing position. When the head mount 140 is in its operative position in this way, however, the switch 342 remains closed and the switch 317 is switched to the position indicated by a solid line in FIG. 2, and thus the transistor Tr12 continues to be off. As a result, charging current of the capacitor C4 flows into the base of the transistor Tr13 and the same turns on. Then the solenoid 333 is enegized and the L-shaped lever 145 is actuated to release the head mount 140 from its operative position as seen from FIG. 4. Thus, the tape recorder is automatically brought into inoperative condition shortly after the last cassette is discharged.

The foregoing concerns automatic turning over and discharging of the cassette which operations are effected after recording or reproducing has been completely finished with respect to either one or both sides of the cassette. However it should be noted that such turning over or discharging can be effected at any moment in the recording or reproducing mode through manual operation.

When it is desired to discharge the cassette through manual operation, the switch 338 is manipulated to take the position indicated by a broken line in FIG. 2 by depressing the cassette discharging button 14 for a moment. Then the solenoids 248, 331 and 333 are energized to discharge the cassette in the same way as described above in connection with automatic discharging.

When it is desired to turn over the cassette through manual operation, the switch 343 is temporarily closed by an operator thereby grounding the base of the second transistor Tr6 of the bistable multivibrator 332. Accordingly, the multivibrator 332 takes the other stable condition in which the transistor Tr6 is in its off state. The solenoids 331 and 333 are then energized and the cassette is turned over.

When it is desired to temporarily stop the magnetic tape as known in conventional tape recorders, the switch 344 is temporarily closed by an operator thereby separating the pinch roller 143 fromthe capstan 23. Nevertheless, the operative voltage is applied to the Schmitt circuit 328.

As evident from FIG. 2, the switches 318, 339 and 341 are connected in parallel to the power switch 334 and therefore, if the power switch 334 is opened in the course of the automatic turning over and discharging operation, such operation will continue. However, when the head mount 140 returns to its inoperative position after discharging the final cassette, all of the switches 318, 339 and 341 are opened. In more detail, the switches 318 and 341 are already opened and the switch 339 is opened in coincidence with return of the head mount 140 to its inoperative position.

It is to be noted that the present invention as above described is applicable to not only recording operation but also to playback operation of the cassette type tape recorder.

According to the present invention, a cassette is automatically turned over and discharged for successive recording or reproducing of the cassette with respect to either side thereof, and therefore the longest possible continuous recording or reproducing can be effected without any manual manipulation. It is also possible in the present invention that a plurality of cassettes which are loaded in the tape recorder are lowered one after another onto the formal recording or reproducing position. Use of rack and pinion structure assures the discharging of the cassette. It is very convenient in the tape recorder according to the present invention that the power source is automatically cut off just after the final cassette is discharged.

It is to be understood that the embodiment described herein is illustrative only and is not intended as limiting the invention to the construction and arrangement of parts as it is well understood that the invention may be applied to any cassette type tape recorder differing from the embodiment but within the scope of this invention as defined in the appended claims.

What is claimed as new and desired to be secured by letters patent of the United States is:

1. A cassette type tape recording and reproducing apparatus including an electric driving means and a main frame comprising:

lifting means for disengaging a cassette containing magnetic tape from said driving means, reversing means for turning over said cassette about an axis parallel to a major surface of said cassette and normal to the traveling direction of said tape within said cassette, said reversing means including a cassette guide member of generally semicircular shape and a rotatable cassette receiving means for slidably engaging said cassette, said rotatable cassette receiving means having an axis of rotation lying outside said cassette guide member, control means in operable relationship with said driving means for driving said lifting means and said reversing means in a predetermined relationship, such that said cassette is first disengaged from said driving means and then turned over, carrying means driven by said driving means for transporting said cassette from a position at which it cooperates with said driving means to a position at which it cooperates with said reversing means, connecting means for coupling said control means to said driving means when said tape is completely wound on one reel of said cassette, an electromagnetic transducer operatively engageable with said tape, and, positioning means for placing said electromagnetic transducer in operative engagement with said tape only when said tape recording and reproducing apparatus is in a recording or reproducing mode.

2. A cassette type tape recording and reproducing apparatus including an electric driving means and a main frame as in claim 1, wherein said lifting means comprises:

a flat panel having upstanding walls on at least two sides thereof and including a pair of apertures cooperating with said driving means and an additional aperture spaced from said pair of apertures and sufficiently large to permit a cassette to be rotated therein.

3. A cassette type tape recording and reproducing apparatus including an electric driving means and a main frame as in claim 1, wherein said rotatable cassette receiving means comprises:

a pair of F-shaped sheets jointed together at one edge thereof to form a cassette receiving zone between said F-shaped sheets, and, a plurality of rollers mounted on said F-shaped sheets for engaging said cassette.

4. A cassette type tape recording and reproducing apparatus including an electric driving means and a main frame as in claim 1, wherein said control means further comprises:

a plurality cams secured to a shaft in spaced relationship with respect to one another, a main gear secured to said shaft, said main gear having a toothed outer periphery for cooperating with said electric driving means, a notch in said toothed priphery for providing a neutral position, a camming groove in one face of said main gear for controlling said carrying means, and a projection on said face for cooperating with said connecting means.

5. A cassette type tape recording and reproducing apparatus including an electric driving means and a main frame as in claim 1, wherein said carrying means further comprises:

a cassette engaging member slidably mounted within said lifting means, an elongated sliding plate coupled to said cassette engaging member and having a pair of racks formed intergrally therewith, a pinion gear drivingly coupld to said electric driving means and selectively engageable with said racks, and, a cam follower assembly coupled to said pinion gear to cause selective engagement with said racks in accordance with the operation of said control means.

6. A cassette type tape recording and reproducing apparatus including an electric driving means and a main frame as in claim 1, wherein said connecting means comprises:

a solenoid coupled to a pivoted lever assembly for selectively engaging said control means to start the operation thereof.

7. A cassette type tape recording and reproducing apparatus including an electric driving means and a main frame as in claim 1, wherein said positioning means comprises:

a head mount for supporting said electromagnetic transducer, said head mount pivotally mounted to said main frame, biasing means coupled to said head mount for biasing said head mount toward an inoperative position, a cam actuated lever assembly pivotally mounted to said main frame for selectively locking said head mount in an operative position, and, solenoid operated means engaging said head mount for selectively moving said head mount to its inoperative position.

8. An automatic cassette reversing tape recording and reproducing apparatus including an electric driving means and a main frame comprising:

lifting means for disengaging a cassette containing magnetic tape from said driving means, reversing means for turning over said cassette about an axis that is parallel to a major surface of said cassette and normal to the traveling direction of said tape within said cassette, discharging means for ejecting said cassette from said tape recording and reproducing apparatus, wherein said discharging means includes cam means for providing a camming action, clutch means engageable with the driving means coupled to said cam means, and, a rack and pinion selectively engageable with one another through said camming action;

actuating means for selectively operating said reversing means and said discharging means, control means including a plurality of cams in operable relationship with said driving means for driving said lifting means and said reversing means in a predetermined relationship, such that said cassette is first disengaged from said driving means and then turned over, an electromagnetic transducer operatively engageable with said tape, positioning means for placing said electromagnetic transducer in operative engagement with said tape only when said tape recording and reproducing apparatus is in a recording or reproducing mode, loading means driven in synchronism with said discharging means for loading fresh cassettes into said tape recording and reproducing apparatus, said loading means including a pair of cassette holding members rotatably driven in cooperation with said discharging means, each cassette holding member including a first holding portion for holding the lowermost cassette of a stack of cassettes to be fed into said tape recording and reproducing apparatus and a second holding portion adapted to be inserted between said lowermost cassette and the next cassette in said stack, said second holding portion integral with said first holding portion and including an arcuate face which joins said first and second holding portions, and wherein said first and second holding portions pivot about an axis which is located at the center of curvature of said arcuate face;

carrying means driven by said driving means for transporting said cassette from a position at which it cooperates with said driving means to a position at which it cooperates with said reversing means, and, interlocking means for rendering said carrying means inoperable during operation of said discharging means.

9. An automatic cassette reversing tape recording and reproducing apparatus including an electric driving means and a main frame as in claim 8, wherein said discharging means further comprises:

a discharging member coupled to said rack and movable therewith for engaging one edge of a cassette and for linearly sliding said cassette as said rack is driven by said pinion until said cassette has been ejected from said tape recording and reproducing apparatus.

10. An automatic cassette reversing tape recording and reproducing apparatus including an electric driving means and a main frame as in claim 8, wherein said cam and clutch means further comprise:

a rotatable shaft, a cam device having a plurality of peripheral camming surfaces rotatably mounted to said shaft, a first clutch portion, rigidly mounted to said cam device, and, a second clutch portion coupled to said shaft so as to permit longitudinal but not rotational motion with respect to said shaft, said second clutch portion engaging said first clutch portion for imparting rotational motion thereto upon operation of said actuating means.

11. An automatic cassette reversing tape recording and reproducing apparatus including an electric driving means and a main frame as in claim 8, wherein said actuating means comprises:

a sleeve engaging at least a portion of said clutch means, said sleeve having at least one shoulder formed thereon, a stepped sliding plate slidably mounted to said main frame and engaging said shoulder, and, solenoid means coupled to said stepped sliding plate for imparting movement thereto whereby said stepped sliding plate moves said sleeve.

12. An automatic cassette reversing tape recording and reproducing apparatus including an electric driving means and a main frame as in claim 8, wherein said carrying means comprises:

a second rack and pinion assembly, wherein said pinion is selectively engageable with said rack.

13. An automatic cassette reversing tape recording and reproducing apparatus including an electric driving means and a main frame as in claim 12, wherein said interlocking means comprises:

a solenoid and lever assembly for engaging said pinion and selectively moving it out of engagement with said rack.

* * * * *